(12) United States Patent
Jensen (10) Patent No.: US 11,981,049 B2
(45) Date of Patent: May 14, 2024

(54) GEOPOLYMER FOAM DEPOSITION AND MIXING SYSTEM AND APPARATUS

(71) Applicant: Rosenblatt Innovations LLC, Petaluma, CA (US)

(72) Inventor: David I. Jensen, Santa Rosa, CA (US)

(*) Notice: Subject to any disclaimer, the term of this patent is extended or adjusted under 35 U.S.C. 154(b) by 573 days.

(21) Appl. No.: 17/309,163

(22) PCT Filed: Oct. 31, 2019

(86) PCT No.: PCT/US2019/059119
§ 371 (c)(1),
(2) Date: Apr. 30, 2021

(87) PCT Pub. No.: WO2020/092740
PCT Pub. Date: May 7, 2020

(65) Prior Publication Data
US 2022/0001575 A1  Jan. 6, 2022

Related U.S. Application Data

(60) Provisional application No. 62/753,788, filed on Oct. 31, 2018.

(51) Int. Cl.
| | | |
|---|---|---|
| B28B 1/50 | (2006.01) |
| B28B 13/02 | (2006.01) |
| B28C 5/12 | (2006.01) |
| B28C 5/34 | (2006.01) |
| B28C 7/04 | (2006.01) |
| C04B 28/00 | (2006.01) |
| C04B 38/02 | (2006.01) |

(52) U.S. Cl.
CPC .......... *B28B 1/503* (2013.01); *B28B 13/0215* (2013.01); *B28C 5/1207* (2013.01); *B28C 5/1215* (2013.01); *B28C 5/34* (2013.01); *B28C 7/04* (2013.01); *C04B 28/006* (2013.01); *C04B 38/02* (2013.01)

(58) Field of Classification Search
CPC .... B28B 1/503; B28B 13/0215; B28C 5/1207
See application file for complete search history.

(56) References Cited

U.S. PATENT DOCUMENTS

| 4,269,577 A | 5/1981 | Borcoman |
| 2017/0203469 A1 | 7/2017 | Cartier |
| 2017/0218642 A1 | 8/2017 | Jensen |
| 2017/0348886 A1 | 12/2017 | Fux et al. |

FOREIGN PATENT DOCUMENTS

WO  WO/2018/189151 A1  10/2018

OTHER PUBLICATIONS

Saldaev, VA, et al. Equipment for the Production of Wood-Polymeric Thermal Insulation Materials. IOP Conf. Ser.: Mater. Sci. Eng. 2016, vol. 142; DOI: 10.1088/1757-899X/142/1/012097; p. 1, Abstract; p. 1, Section 1. Introduction, First Paragraph to Third Paragraph; p. 2, Section 2, First Paragraph; p. 3, Figure 2; p. 3, Figure 2—caption; p. 4, First Paragraph.

*Primary Examiner* — James Sanders
(74) *Attorney, Agent, or Firm* — Craig M. Stainbrook (57) ABSTRACT

The present invention relates to a system for the production of thermal insulating, architectural and structural foam materials cast in molded volumes configured for a subsequent milling process, wherein molded foam volumes are cut into dimensional products or product components.

18 Claims, 9 Drawing Sheets

GEOPOLYMER FOAM DEPOSITION AND MIXING SYSTEM AND APPARATUS

BACKGROUND OF THE INVENTION

Technical Field

The present invention relates to material mixing and deposition systems for wet cast cementitious materials. More particularly the invention relates to a method and apparatus that minimizes material handling for batching, mixing, and depositing time-sensitive cementitious wet cast formulas into production molding. More specifically, the present invention relates to a production system for mixing and casting aerated autoclaved concrete ("AAC") and geopolymer foam. Finally, and even more particularly, the invention relates to a system for the production of thermal insulating, architectural and structural foam materials cast in molded volumes configured for a subsequent milling process, wherein molded foam volumes are cut into dimensional products or product components.

Background Art

Worldwide energy consumption is projected to grow as much as 40% in the next 20 years, due not only to sheer human population growth, but growth in populations using electric power. The dilemma in electricity production is in the trade-off between improvements in the material well-being of individuals that accompany the use of electricity and the adverse environmental impacts from fossil fuel consumption.

Thermal management of conditioned space buildings in developing economies is a notable component in overall energy consumption. Therefore the thermal efficiencies of conditioned space buildings are high on the list of potential energy savings technologies. The use of thermally insulating materials constitutes the most effective way to increase the efficiencies of these conditioned space buildings. These materials consist substantially of variably refined polystyrene and polyurethane foams and glass fibers. To a lesser degree they consist of soy-based foams, cellulose, vermiculite, asbestos fiber, and cork. These materials have become very important to global building industries and represented a 21 billion dollar market share in 2014 in Europe alone.

The problem with currently used thermal insulating materials, and an important current issue in future energy demands, is that their manufacture and use is associated with negative environmental impacts (cork and vermiculite excepted). For example, the refinement of polystyrene foam involves the production of benzene and chlorofluorocarbons, and the resulting commercial products contain antioxidants and ignition retardant additives. The refinement of polyurethane involves the production methyl isocyanates gas (MIC) a dangerous compound widely known for its tragic association with the tragic 1984 Union Carbide disaster in Bhopal, India.

Additionally polystyrene and fiberglass both require high temperature processing. Troublingly, polystyrene and polyurethane release lethally toxic and explosive fumes when burned. Understandably, these flammable foams have been outlawed for use in conditioned space buildings in many jurisdictions throughout the U.S., Europe and Japan.

There is a growing interest and demand for sustainable building systems and net-carbon-zero construction to reduce future energy demands to sustainable levels. To provide new sustainable building systems, building and manufacturing industries must provide thermal insulating materials produced from clean sustainable technologies.

Air entrained Portland cement mortars and concretes are well known in the art, but the potential for weight-to-volume reduction is extremely limited in air entrained masonries. Therefore, they are very limited in their application as thermal insulating materials. AAC systems have more potential for lower weight-to-volume ratios and offering thermal insulation and structural values suitable for building materials, but AAC systems rely substantially on the binding properties of Portland cement. In addition to the high energy demands and carbon emissions of Portland cement production, AAC mortars and concretes require the additional energy demands and carbon emissions of autoclave temperatures and pressures for curing.

More recently, the development of geopolymer foam, or foamed geopolymers, constitutes a promising research field with high potential for the development of sustainable and non-toxic thermal insulation materials. Similar to AAC systems, geopolymer foam systems utilize various foaming agents that expand the volume of the geopolymer composition to an aerated porosity capable of lower weight-to-volume ratios. The foaming agents consist of two different classes: (1) gas producers; and (2) foam modifiers. The gas producers include (but are not limited to) metallic aluminum powder, zinc powder, sodium percarbonate, sodium perborate and hydrogen peroxide. The foam modifiers include various detergents containing surfactants. The most effective foaming agents are the gas-producing agents.

Metallic aluminum and zinc powders produce hydrogen gas when mixed into highly alkaline geopolymer and AAC systems. Sodium percarbonate, sodium perborate, and hydrogen peroxide all produce oxygen. The foam-modifying detergent surfactants have both hydrophilic and hydrophobic components that reduce the surface tension of water to form bubbles. Surfactant foaming agents are used in three ways. One is premix foaming wherein the surfactant is added to water and mixed aggressively to form a premix foam, and it is then mixed into a cementitious or geopolymer paste. A second approach, postmix foaming, involves adding the surfactant directly to a wet cementitious mix and then mixing aggressively to form foam in the cementitious or geopolymer paste. A third approach is to use the surfactant in conjunction with one of the gas-producing foaming agents to intensify and manage the cell size and structure of the foam generation.

Little to no heat generation is required and no toxic fumes are emitted in the production of geopolymer foam or in the production of its components. Furthermore geopolymer foam is extremely fire resistant and does not off-gas when subjected to heat or flame. This makes geopolymer foam well-suited as a replacement for petrochemical foams for use as thermal insulating materials in many conditioned space building applications.

Currently, the most significant deficiency in geopolymer foam development and its applications is due to the complexity of the system and the time-sensitive nature of foam generation. Geopolymer foam systems usually require at least a three-part mix consisting of aluminum silicate clays, alkaline activators, and foaming agents. Once the alkaline activator of the geopolymer is added to the aluminum silicate clays, typical geopolymer systems start to gel and quickly harden in 10 to 30 minutes, depending on raw material options and ratios. Many formulations, depending on water content, will stiffen in five minutes or less, even when agitated. They will stiffen even faster if not agitated. Once a gas-producing foaming agent is added to the geopolymer system, depending on the amount of reactive material and the level of refinement, the production of gas and the expansion of the foam usually starts in only one to five minutes.

The most effective foaming agents for large volume expansion are gas-producing agents. These agents react with the alkalinity of the geopolymer and AAC paste. The higher the alkalinity of the cementitious paste, and the higher the required ratio of foaming agent, the more gas is produced, and therefore the more foam generated and expansion realized.

To expand a geopolymer foam system to the levels of aeration necessary to produce a material with a meaningful thermal insulation value, higher ratios of the most reactive foaming agents must be employed, making the production of foam expansion almost immediate. Furthermore, the reactive ingredients in such geopolymer foam systems create an exothermic reaction dramatically intensified in larger volume batches, accelerating the foam generation and early-stiffening of the batch. This limits the available options for material delivery and deposition in the larger volumes typically employed in industrial production.

Concrete mixers typically consist of cylindrical and bulbous drum containers with internal mixing blades or paddles fixed on and extending inwardly from the interior sides of the drum. The drum—thus the blades—rotates at variable rotation speeds ranging between 20 and 40 rpms. The rotation typically takes place around a tilted axis at variable degrees of tilt, from a substantially horizontal axis of rotation up to 45 degrees of tilt, at most. These are referred to as tumble mixers.

Planetary mixers are also employed for mixing concrete and mortars. Generally, they consist of cylindrical drums having a flat bottom floor with cylindrical walls extending vertically and open tops, often with lid enclosures. Planetary mixers have a plurality of internal mixing blades turning on at least one vertical axis. These are independent from a fixed drum in addition to the multiple or planetary axis of rotation. The fixed mixing drum configuration also commonly employs a mixer blade apparatus with a single axis of rotation.

Mixers employed for mixing mortars consist generally of horizontally disposed cylindrical mixing drums in which a portion of the cylinder drum is employed as a functional enclosure to an open top. These mortar mixers have a plurality of internal mixing blades rotating independently from the mixing drum, about a horizontal axis and employ a variable of single and multiple axis rotations.

Mixer adaptations for AAC production often include internal mixing blades rotating about a vertical axis inside a substantially enclosed, fixed cylindrical drum with a bottom floor extending down in a conical or half spherical shape. The mixed material is expelled through a port approximating the bottom of the mixing cavity. Mixed material is usually expelled into a separate material handing device or container. The port may also be connected to an enclose auger type conveyor that facilitates transport to another material handling apparatus and/or mold that facilitates transport to the autoclave.

In general material deposition from concrete and mortar mixers, whether the mixers comprise a fixed drum with rotating blades or a rotating drum with fixed blades, is facilitated by the movement of the internal mixing apparatus expelling the mixed material from the bottom or sides of the mixing cavity.

GFRC mixers generally consist of a blade- or paddle-type mixing apparatus at the bottom end of a vertically extended shaft lowered into a cylindrically shaped mixing drum where the batched material is mixed. After mixing is completed, the mixing apparatus is removed from the mixing drum, and the mixing drum is removed from its fixed position below the mixing apparatus and moved to the location of a mold or pump hopper. The mixing drum is then turned upside down to allow the deposition of the GFRC mix into a mold, pump, or chop gun hopper.

The most significant deficiency in extant mixers and related production systems disclosed herein for the production of time-sensitive wet cast systems is that the mixing, deposition, and transport of mix to the mold in all of these systems require separate, independent and therefore multiple apparatus for material handling. In many cases the production sequence simply takes too much time for a fast curing or quickly expanding gas producing system.

Disclosure of Invention

It is a principal object of the present invention to extend and expand the potential applications of time-sensitive wet cast systems and geopolymer foam systems. This is achieved by providing methods and supporting apparatus to effectively reduce the material handling time typically involved in the mixing, placement, and molding of geopolymer foam and other time-sensitive wet cast systems. The inventive method and apparatus combines mixing and inoculation of the mix, with the deposition of the inoculated mix into a production mold in one multifaceted apparatus.

The foregoing objectives are realized by providing novel methods and apparatus in which the functions of several distinct production apparatus support four distinct methods in one systematic position.

The inventive apparatus includes an open top production mold forming a three-dimensional cavity, an articulating mix containment cylinder and an articulating mixing apparatus. The apparatus includes the following:

(1) The production mold is a conventional box, with a bottom floor surface and four vertical side walls with an open top. (2) The mix containment apparatus consists of a vertically disposed cylinder having open upper and lower ends. Supporting apparatus is configured to articulate the open-ended cylinder up and down, effectively positioning the cylinder inside the larger volume production mold in such a way that the bottom, open end of the cylinder is seated to the floor of the production mold. The support apparatus then effectively removes the cylinder up and out from the seated position on the mold floor to a remote position outside the mold and back again to the seated position in the mold. (3) The mixing apparatus includes motor driven mixing blades or paddles configured at the bottom of a vertically disposed shaft operatively coupled to a motor through the articulating support apparatus. The blades are sized to rotate inside the cylindrical mix container with close tolerances between the blade tips and the interior side of the container.

The mixing apparatus includes four steps in a geopolymer manufacturing method without material handling in between methods, summarized as follows: (1) batch containment, whereby, raw materials for a cementitious formula are batched into the mix containment cylinder seated on the floor of the production mold; (2) lowering a mixing head of the mixing apparatus into the batched materials in the containment cylinder to mix the contents of the cylinder, and after mixing removing mixing head from the cylinder to a remote position; (3) depositing the mixed batch into the production mold by raising and articulating the containment cylinder out of the production mold, leaving the mixed batch on the floor of the mold; and (4) allowing the foam expansion of the deposited batch to fill the production mold.

Other novel features characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

BRIEF DESCRIPTION OF THE DRAWINGS

The invention will be better understood and objects other than those set forth above will become apparent when consideration is given to the following detailed description thereof. Such description makes reference to the annexed drawings wherein.

BEST MODE FOR CARRYING OUT THE INVENTION

Referring to FIGS. 1 through 7, wherein like reference numerals refer to like components in the various views, it will be seen that the inventive system includes a system and apparatus 10 for producing large volume, expanded geopolymer foam pieces—blocks for example—intended for a subsequent milling process. Products or product parts are milled from large volume blocks of the molded expanded foam.

The system includes three general production phases.

Figure 1:
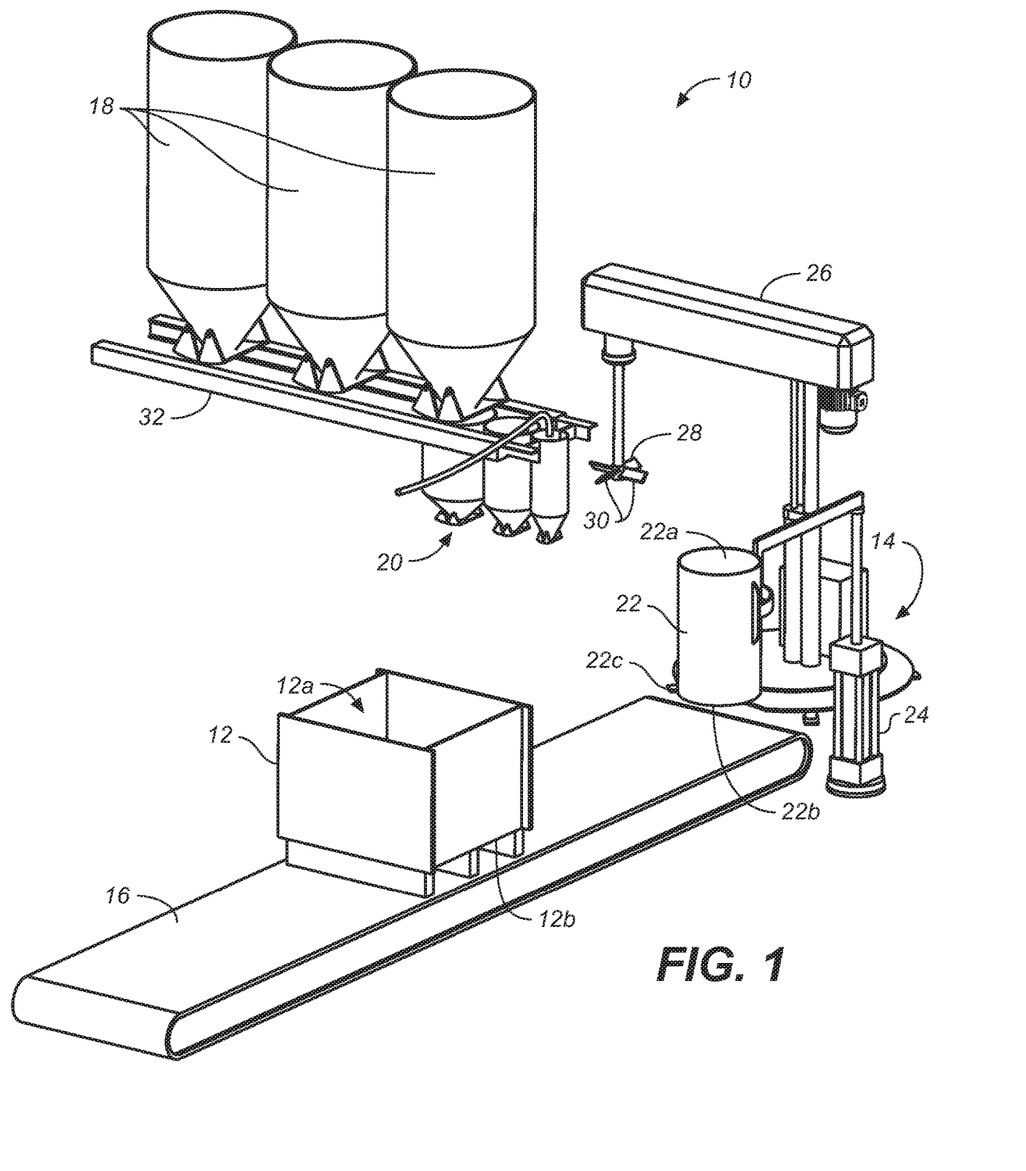
FIG. 1 is a highly schematic upper perspective view showing the geopolymer foam mixing and deposition system and apparatus of the present invention.
Figure 2:
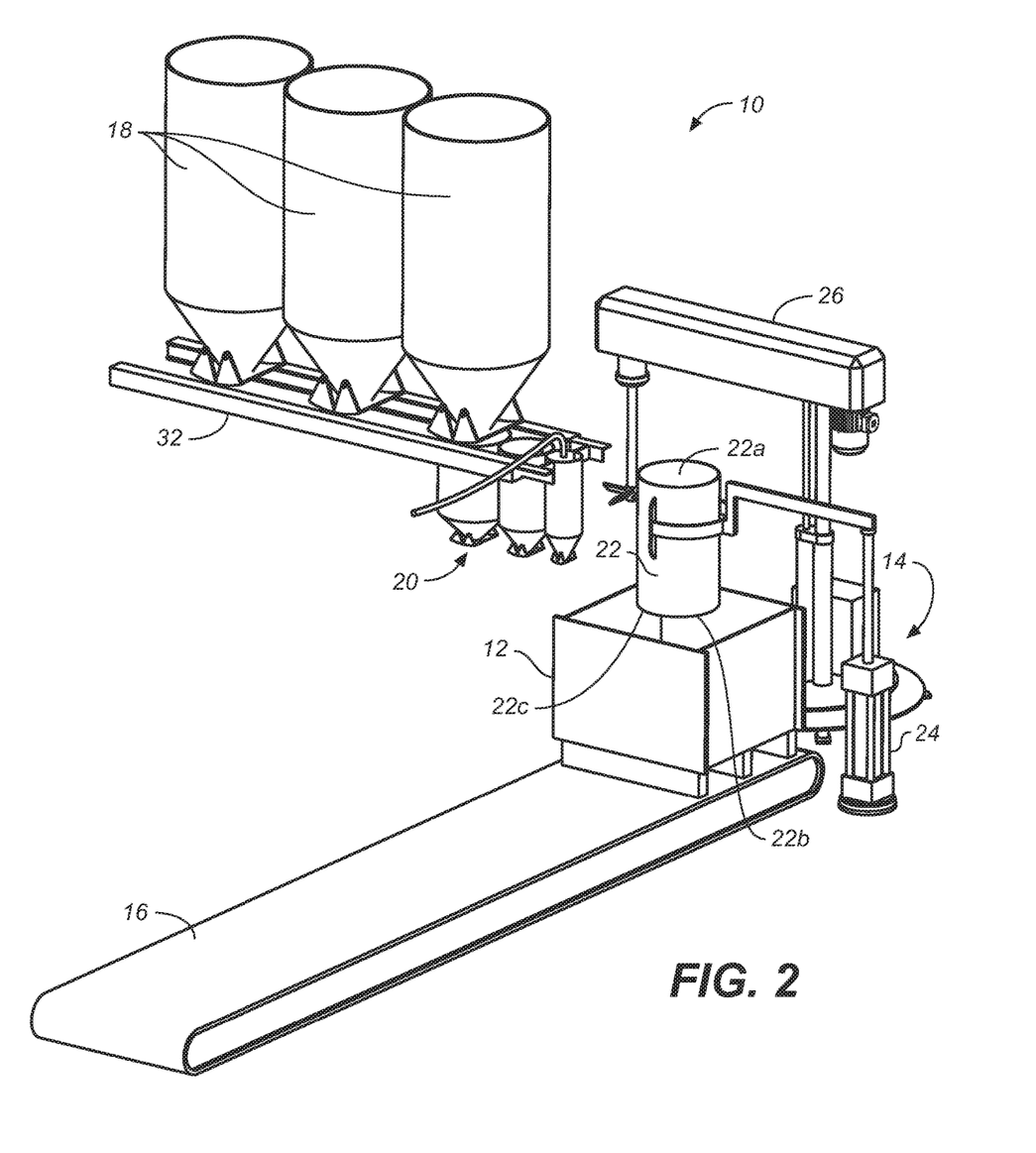
FIG. 2 is the same view showing an (expansion containment) production mold moved into place at a batching and mixing station and a mix containment cylinder moved into place and poised above the production mold before being lowered into the production mold.
Figure 3:
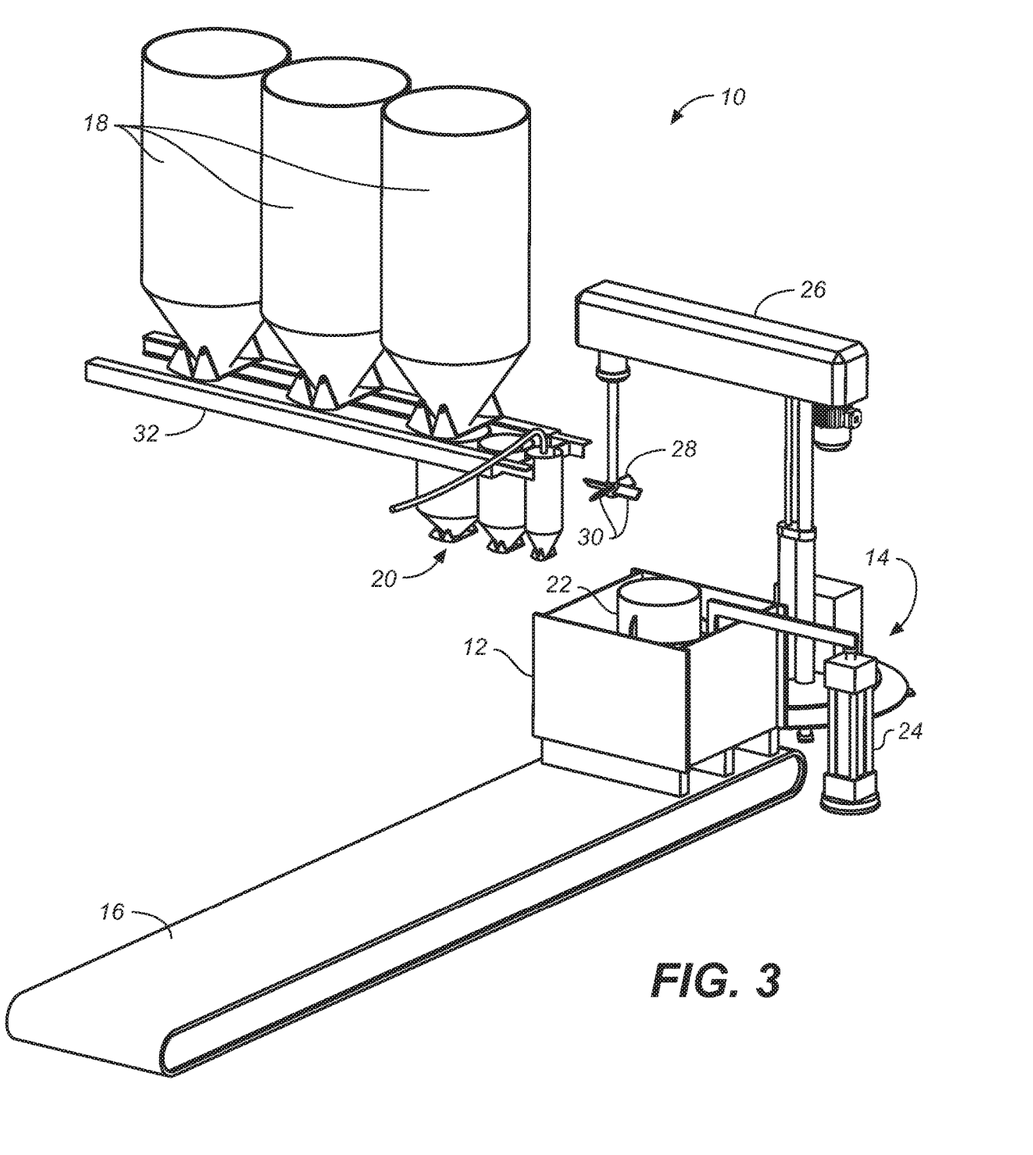
FIG. 3 is the same view showing the mix containment cylinder lowered into the production mold and readied for deposition and inoculation with the foam constituents.
Figure 4A:
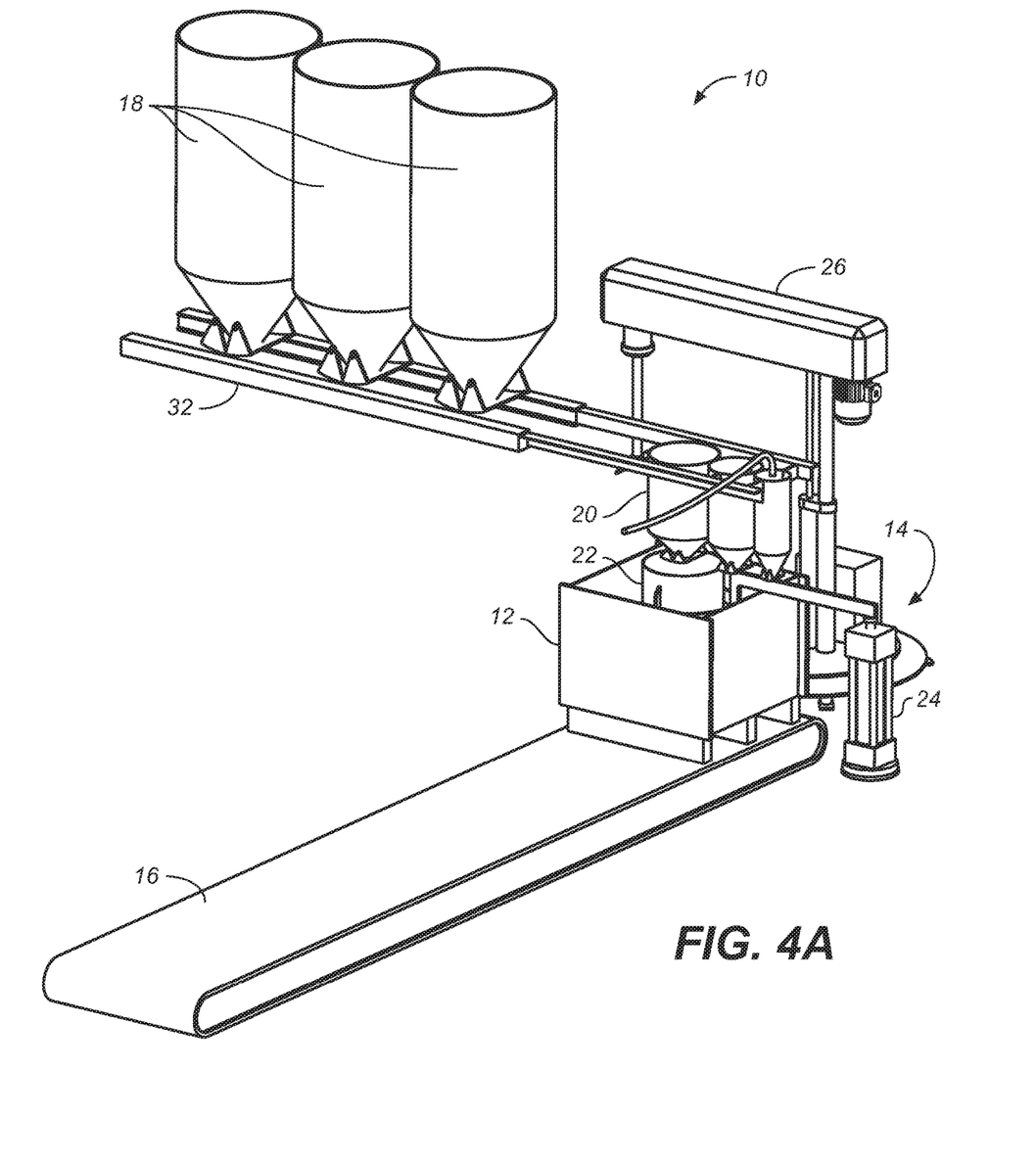
FIGS. 4A-4C are various views showing one of the dose hoppers positioned above the mix containment cylinder for introduction of mix components and an inoculant during dosing.
Figure 4B:
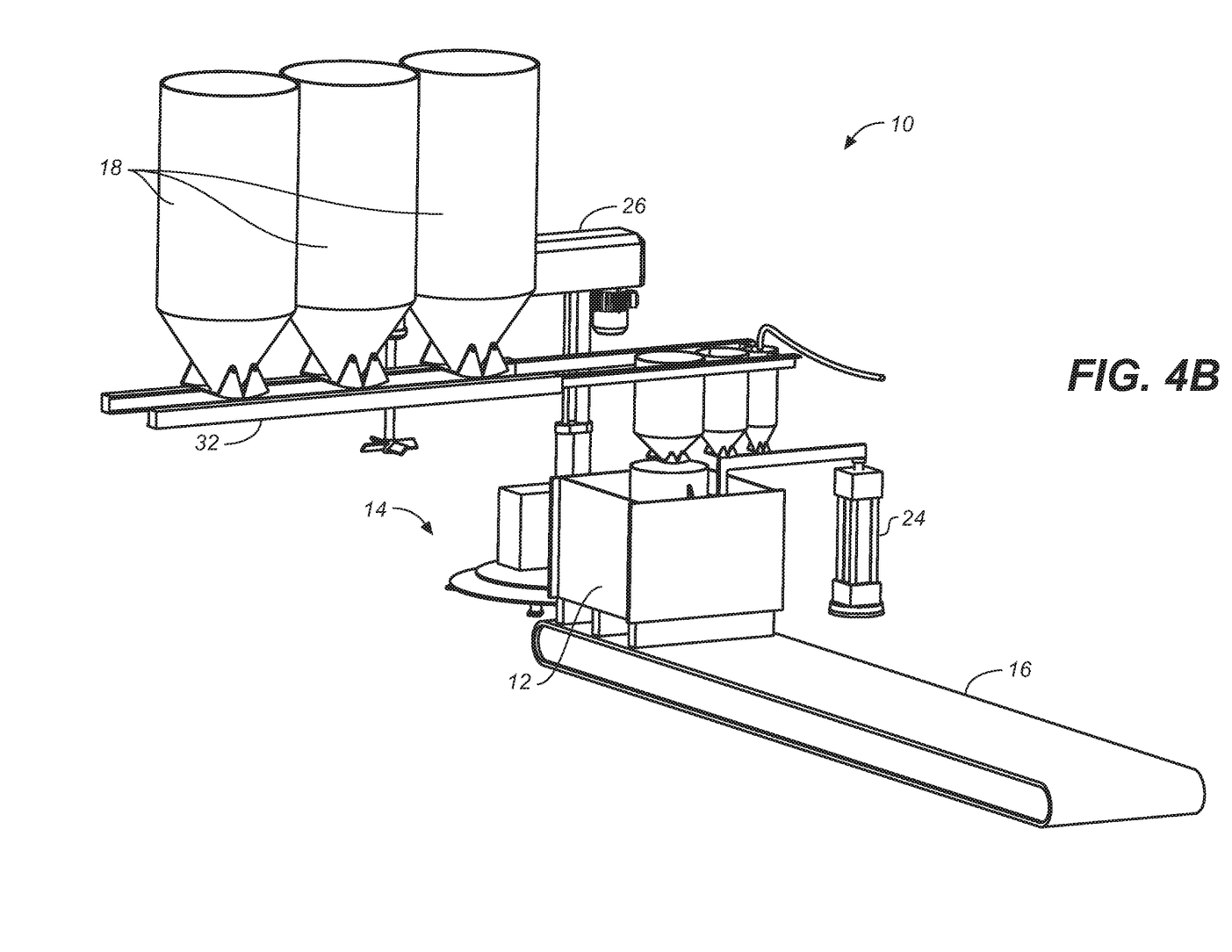
Figure 4C:
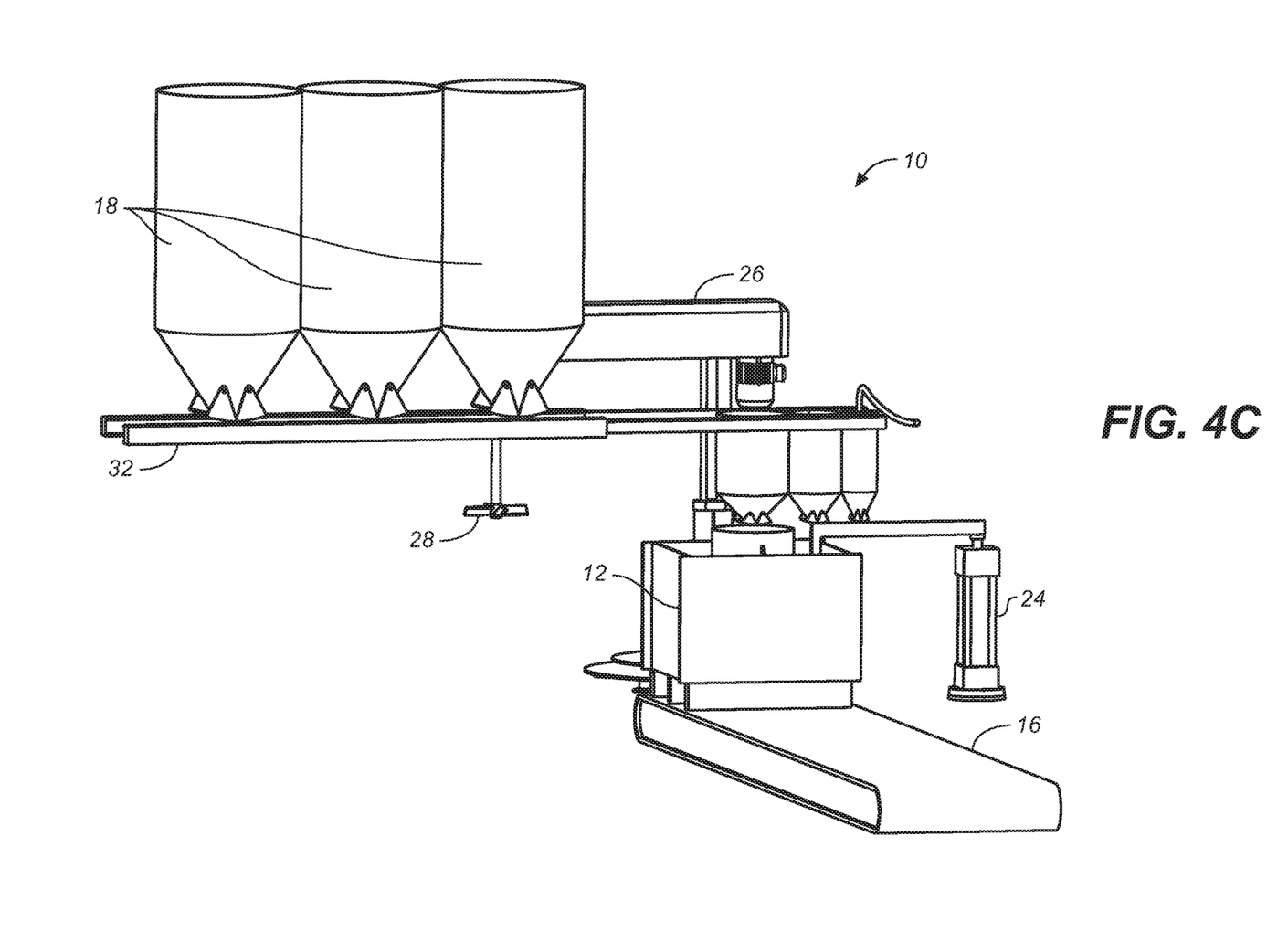
Figure 5:
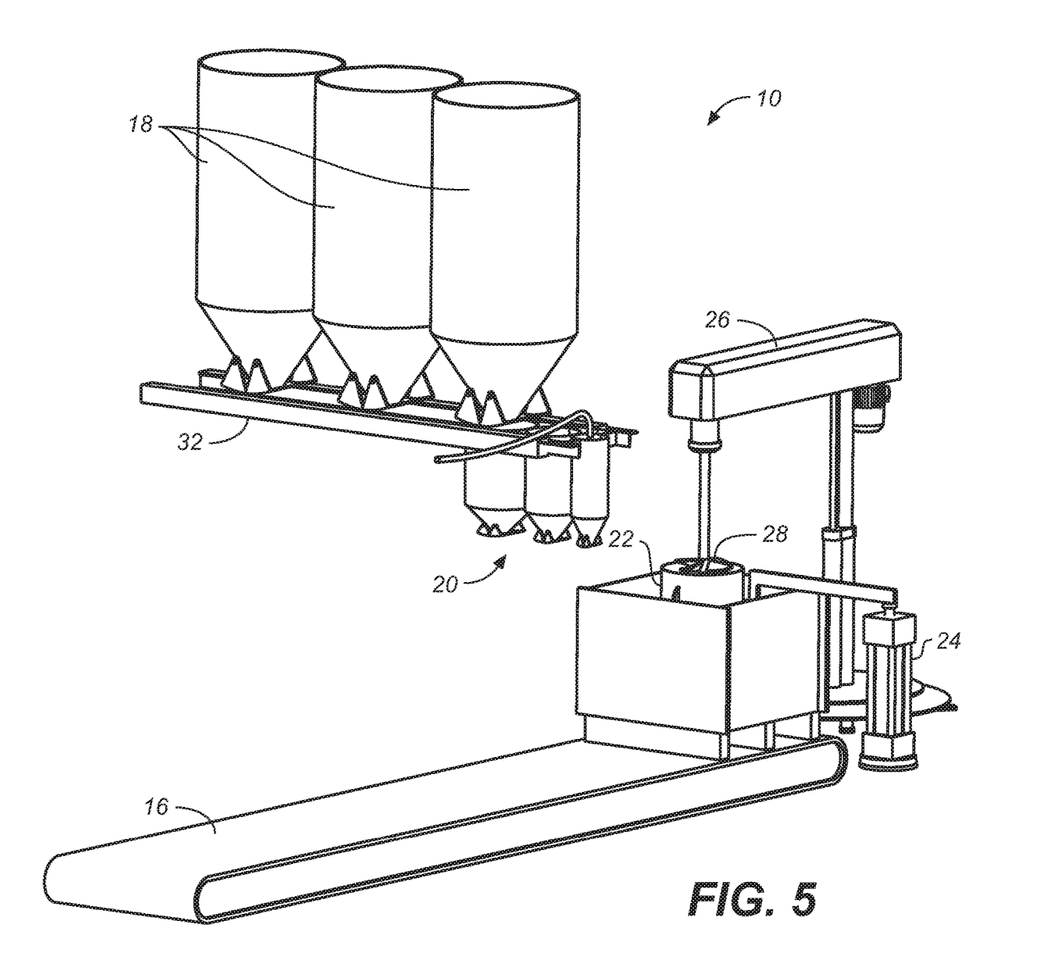
FIG. 5 is an upper perspective view showing the mixing head poised above the mix containment cylinder, as it would be immediately prior to mixing or immediately after.
Figure 6:
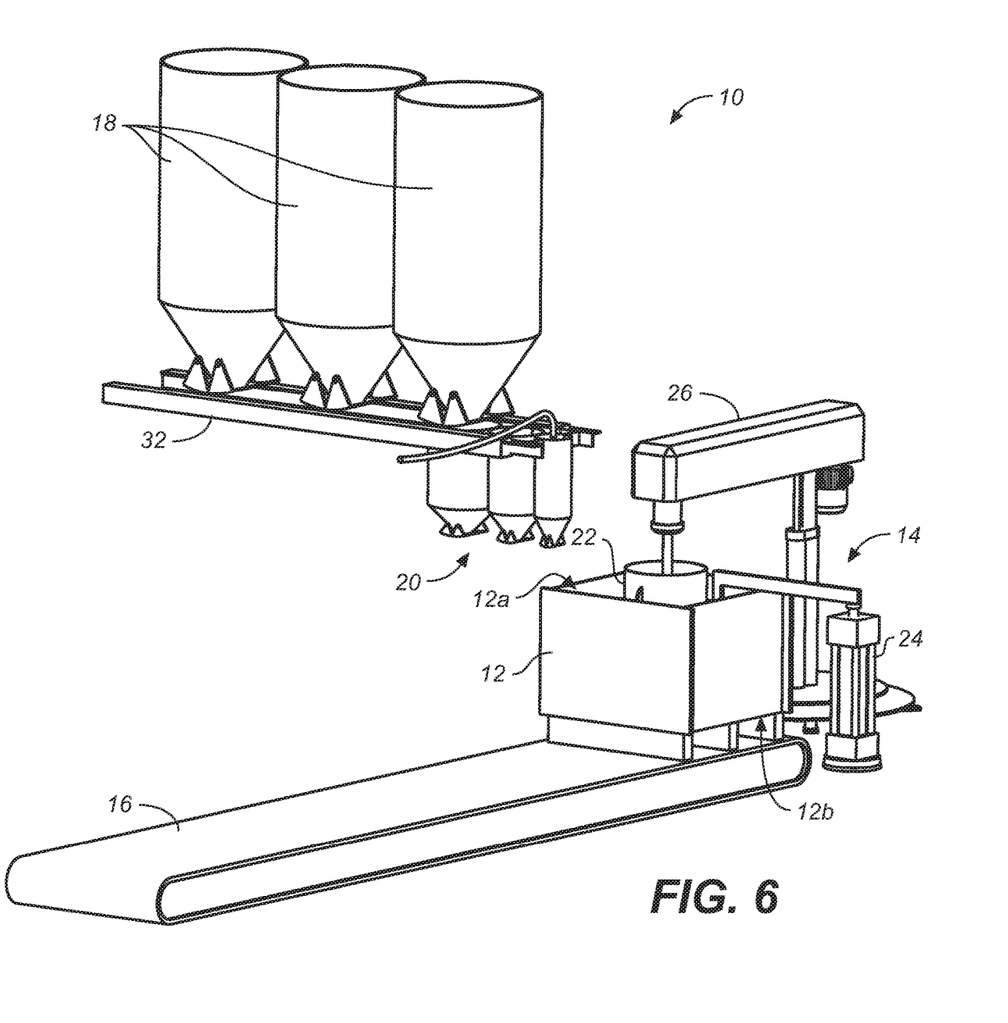
FIG. 6 shows the mixing head lowered into the pre-mix cylinder for mixing.
Figure 7:
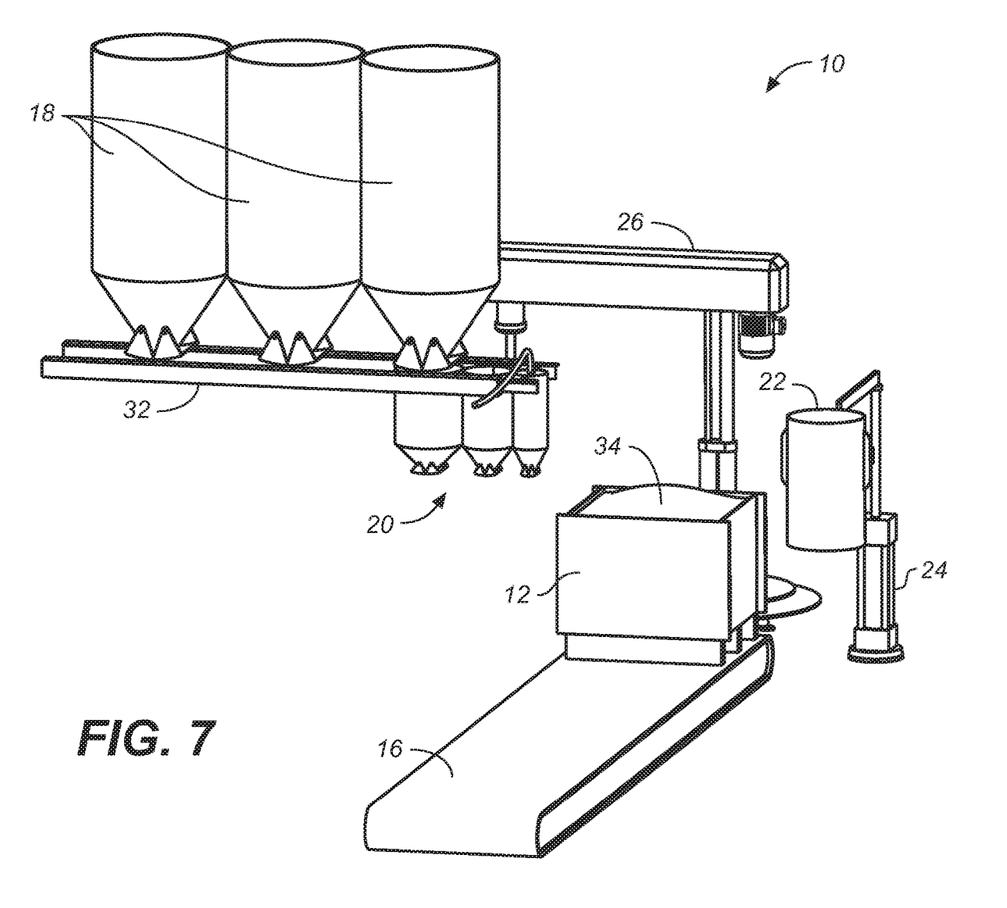
FIG. 7 is an upper perspective view showing the mix containment cylinder removed from the production mold and the expansive geopolymer foam mix expanding and/or expanded into the confines of the production mold.

Phase 1—Batching, Mixing, and Inoculation: An expansion containment mold (i.e., a production mold) 12 is moved into mixing/deposition station 14 using variations of a heavy duty bulk material handling industrial conveyor 16, such as but not limited to a roller conveyor, steel belt, flat slider, or roller chain conveyor, disposed on a production floor. In embodiments, at the mixing/deposition station, bulk materials may be moved into position for dispensing into a container disposed below using an overhead gantry.

The production mold includes an open top 12a and a generally planar floor 12b. Chemical constituents of a cementitious and/or geopolymer mix are batched, mixed, and inoculated with a foam forming agent delivered overhead using both bulk hoppers 18 and dose hoppers 20. Immediately after the constituents are deposited into the mold, the foaming agent is integrated throughout the mix.

The process in Phase 1 is completed in a removable mix containment cylinder 22 having an open top 22a and an open bottom 22b, but which is moved into place and into sealing engagement at its bottom edge 22c with the planar floor or bottom 12b of the larger volume production mold using a pivoting arm and mix containment cylinder actuator 24. A motorized mixer 26 having a head 28 with a plurality of mixing blades or paddles 30 is then rotated into place and the blades lowered into the mix containment cylinder. The mixer is operated until the composition constituents are generally uniformly mixed. [See FIGS. 1-3.]

As with the production mold, the bulk and dose hoppers 18, 20 may be either permanently positioned or selectively moved into place, depending on material conveying means selected for production and whether flowable materials can be pumped from the hoppers into the pre-mix cylinder when in the mixing/batching station. If movement of the hoppers is optimal, an overhead bridge or gantry crane 32 or functional equivalent may be employed.

Phase 2—Deposition: In this phase, the seated mixer is first elevated from and rotated away from the mix containment cylinder, and the mix containment cylinder is then removed from the production mold floor and elevated vertically, up and out of the production mold. This results in the immediate deposition of the inoculated mix through the open bottom of the cylinder into the production mold, inducing immediate foam expansion and initial set of a molded product without having to move the inoculated wet mix from the mixer to the mold. [See FIGS. 5-7.]

Phase 3—Transport and De-Molding: After the geopolymer foam constituents have been thoroughly batched, inoculated, and mixed [see FIG. 7], the expanding geopolymer foam product 34 is allowed to go through stages of curing, either in the mixing/batching station 14 or elsewhere. If the production mold 12 is to be moved to a curing station or environment, it is conveyed from the mixing/deposition station 14 through a loop. At a first stop the product mold remains in a curing environment where the expanded foam product undergoes an initial (in-mold) cure. This is followed by a brief migration out of the curing environment for de-molding, product removal, and mold reassembly. The de-molded foam product is then routed back to a curing environment for a final cure, and the production mold is cycled back into the production loop after any needed attention for cleaning or shape modification.

This production system provides millable foam stock to a production and milling facility with equipment for cutting and milling products or product parts from the foam stock.

Production System Apparatus: The production system of the present invention comprises the following primary subsystems: (1) a production mold; (2) a retractable mix containment cylinder; (3) a deposition and dosing system; and (4) a mixing apparatus. These are described more fully below.

Production Mold: In embodiments, the production mold may consist of a variety of sizes and shapes but the preferred embodiment will be substantially cubical consisting of a flat bottom floor surface, four, flat side walls extending vertically and an open top to accommodate the methods and apparatus for batching, mixing and deposition, and the facilities for foam expansion and initial curing of a millable foam product; the production mold is a sectional assembly configured in such a way as to allow manual or automated disassembly of the mold, removal of the expanded foam product and re-assembly of the mold for continued use. The production mold is configured to be independent from an articulating batching and mixing apparatus and the retractable mix containment cylinder so that multiple production molds can be concurrently used in production by either manual or automated conveyors. The molds are conveyed into position to be engaged first by the mix containment cylinder and then the batching and mixing apparatus, one at a time for (phases 1 and 2) of production loop. Upon the completion of phases 1 and 2, the molds is conveyed in order through the production loop stations.

The production mold components may optionally include a composite wall design with internal heating elements for expedited curing and product removal.

Mix Containment Cylinder: In embodiments, the retractable mix containment cylinder includes a cylinder dimensioned to have a volume suitable for containment of the mixing apparatus and the size of the batch to be mixed. The cylinder walls are disposed vertically and open at both the top and bottom ends of the cylinder. The mix containment cylinder is configured to articulate up and down to allow insertion into the production mold and to be sealingly disposed tightly against the bottom or floor of the production mold. This leaves only an open top through which a mixing head can be passed and through which cementitious and/or geopolymer batch materials can be deposited, mixed and then inoculated with a foaming agent. After inoculation, additional mixing is immediately employed to fully integrate the foaming agent evenly throughout the batch. The mixing blades and mix containment cylinder are then retracted upward and out of the production mold, thereby returning it to a remote position and leaving the inoculated batch in the production mold. The deposited and mixed batch may remain in this station to expand unimpeded with the production of foam to fill the production mold, or it may be conveyed to a curing station to undergo its first stage of curing.

Mixing Apparatus: In embodiments, the mixing apparatus may consist of a single axis or a multiple axis or planetary blade or paddle type mixer configured to move from a remote location to a position above the mix containment cylinder and then configured to move up and down in-line with its rotational axis and effectively in and out of the mix containment cylinder seated in the production mold, and then back again to a remote position.

Raw Material Deposition: The deposition system may include multiple bulk material containers and material conveying apparatus designed to accommodate wet and dry materials. Preferably, the deposition system is configured to move independently from a remote position to a position placing material hoppers above the mix containment cylinder disposed in the production mold. There the mix component materials may be deposited and mixed. After deposition and inoculation, the raw material deposition apparatus is conveyed back to a remote position.

Methods associated with the above apparatus are described in the following steps.

The mixing and batching apparatus 10 and the mix containment cylinder are temporarily disposed in remote positions allowing the production mold to be conveyed into place at the mixing/deposition station.

The mix containment cylinder is then moved into place above the production mold and articulated down into the mold wherein the open bottom of the cylinder is seated tightly to the mold floor.

Premix deposition fixtures are then moved into place above the mix containment cylinder from a remote position to deposit the wet and dry components of the cementitious and/or geopolymer formula into the mix containment cylinder seated on the floor of the production mold and then returning to their remote positions after the premixed batch is fully deposited.

The mixing apparatus is then moved into place above the mix containment cylinder and articulated down into the batched materials contained in the mix containment cylinder to mix components therein.

Another deposition fixture is then moved into place above the mix containment cylinder to inoculate the batch with a foam forming additive. After deposition of the inoculants, it is returned to a remote position. The mixer is again employed to mix material components until the foaming additive is fully dispersed throughout the batch. The mixing head is then articulated up and out of the inoculated mix and returned to its remote position.

Immediately after the mixing apparatus is removed, the mix containment cylinder is articulated up and out of the production mold simultaneously allowing the inoculated mix to spill out the bottom of the cylinder into the larger production mold wherein the inoculated mix then expands with the production of foam; filling the production mold with the cementitious and/or geopolymer foam.

The production molds are of variable size depending on batch formulation and projected percentage of expansion.

The filled production mold (curing or cured) is then conveyed to an initial (in-mold) curing environment until the expanded foam has reached its initial set and is ready for removal.

After the initial (in-mold) cure cycle is completed, the production mold is removed from the (in-mold) curing environment and the expanded foam is removed from the production mold. The expanded foam block is routed to a final curing environment and the production mold is re-assembled and routed back through the production loop for reuse.

The foregoing disclosure is sufficient to enable those with skill in the relevant art to practice the invention without undue experimentation. The disclosure further provides the best mode of practicing the invention now contemplated by the inventor.

While the particular apparatus and method herein shown and disclosed in detail is fully capable of attaining the objects and providing the advantages stated herein, it is to be understood that it is merely illustrative of the presently preferred embodiment of the invention and that no limitations are intended to the detail of construction or design herein shown other than as defined in the appended claims. Accordingly, the proper scope of the present invention should be determined only by the broadest interpretation of the appended claims so as to encompass all such modifications as well as all relationships equivalent to those illustrated in the drawings and described in the specification.

What is claimed as invention is:

1. A system for producing thermal insulating, architectural, and structural foam, the system having multiple stations in a production loop, said system comprising:
   an open top production mold having an open top and a generally planar floor;
   a vertically oriented mix containment cylinder having an open top and an open bottom, and a bottom edge configured for sealing engagement with said floor of said production mold;
   a mechanism for lowering and raising said mix containment cylinder into and from said production mold;
   a material deposition subsystem including movable hoppers for containing and dispensing bulk materials into said mix containment cylinder;
   a motorized mixing apparatus having a rotating head;
   a mechanism for lowering and raising said rotating head into and from said mix containment cylinder for operation of said rotating head in said mix containment cylinder; and
   at least one conveyance mechanism for moving one or more of said production mold, said mix containment cylinder, said mixing apparatus, and said material deposition system into position relative to one another for sequential operations.

2. The system of claim 1, wherein said at least one conveyance mechanism includes a conveyor disposed on a production floor and on which said production mold is disposed for moving said production mold in relation to said mix containment cylinder and said mixing apparatus.

3. The system of claim 2, wherein said at least one conveyance system includes a heavy duty bulk material handling industrial conveyor.

4. The system of claim 3, wherein said industrial conveyor is selected from the group consisting of a roller conveyor, a steel belt conveyor, or a roller chain conveyor.

5. The system of claim 2, wherein said at least one conveyance mechanism includes a mechanism for supporting and moving said mix containment cylinder into position over said open top of said production mold.

6. The system of claim 5, wherein said mechanism for supporting and moving said mix containment cylinder is configured to articulate said mix containment cylinder into position over said open top of said production mold and to move said mix containment cylinder up and down in said production mold in such a way that said bottom edge of said mix containment cylinder is seated to and in sealing engagement with said floor of said production mold.

7. The system of claim 2, wherein said at least one conveyance mechanism includes a mechanism for moving said mixing apparatus into position over said open top of said mix containment cylinder mold.

8. The system of claim 1, wherein said production mold is a sectional assembly comprising a box having four generally vertical side walls configured for repeated and rapid assembly and disassembly.

9. The system of claim 1, wherein said mechanism for supporting and moving said mix containment cylinder is configured to articulate said mix containment cylinder over said open top of said production mold and to move said mix containment cylinder up and down inside said production mold in such a way that said bottom edge of said mix containment cylinder is seated to and in sealing engagement with said floor of said production mold.

10. The system of claim 1, wherein said mixing apparatus includes motor driven mixing blades or paddles configured at the bottom of a vertically disposed shaft operatively coupled to a motor.

11. The system of claim 10, wherein said mixing blades are sized to rotate inside the cylindrical mix container with close tolerances between blade tips and the interior side of the container.

12. The system of claim 10, wherein said mechanism for moving said mixing apparatus is an articulating arm.

13. The system of claim 12, wherein said vertically disposed shaft is coupled to a motor through said articulating arm.

14. The system of claim 1, wherein said material deposition subsystem includes a plurality of bulk hoppers and dose hoppers.

15. The system of claim 14, wherein each of said plurality of bulk hoppers and dose hoppers are permanently positioned.

16. The system of claim 14, wherein each of said plurality of bulk hoppers and dose hoppers are selectively movable in relation to said mix containment cylinder.

17. The system of claim 16, wherein said at least one conveyance mechanism includes a bridge crane for moving said bulk hoppers and said dose hoppers into position over said mix containment cylinder.

18. A multi-station system for producing millable geopolymer foam blocks, comprising:
   a production mold having an open top and a floor;
   a containment cylinder having an open top and an open bottom, said open bottom configured for sealing engagement with said floor of said production mold;
   a bulk material and dose hopper system for dispensing geopolymer ingredients into said containment cylinder;
   a mixer having a movable mixing head sized for insertion and operation in said containment cylinder; and
   conveyance subsystems for moving one or move of said production mold, said containment cylinder, said hopper system, and said mixing head in relation to one or another of said production mold, said containment cylinder, said hopper system, and said mixing head.

* * * * *